Dec. 17, 1940.  W. C. MacFADDEN  2,225,592
FASTENER ATTACHED STRUCTURE AND FASTENER FOR THE SAME
Filed March 2, 1938
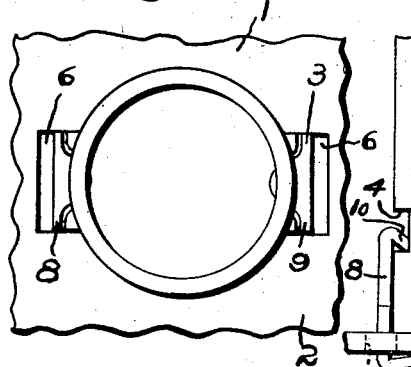
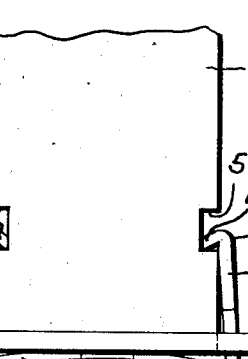
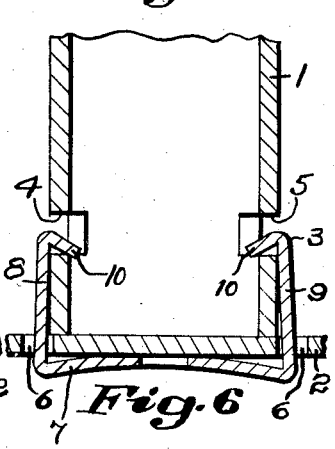
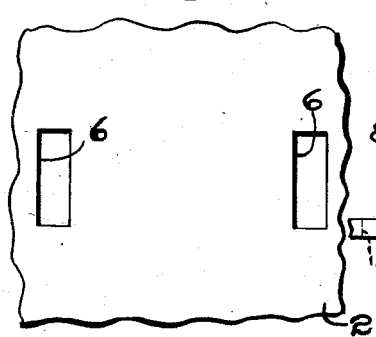
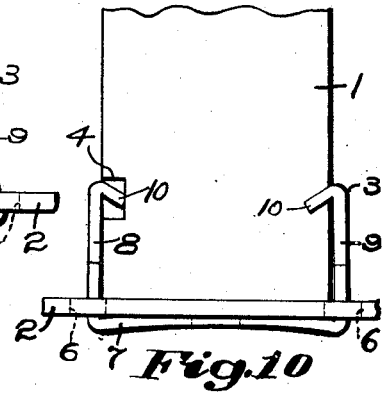
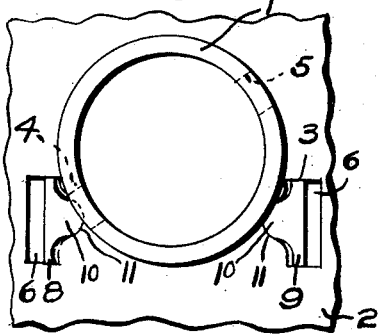
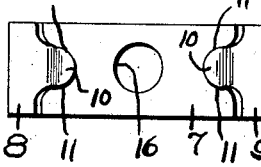
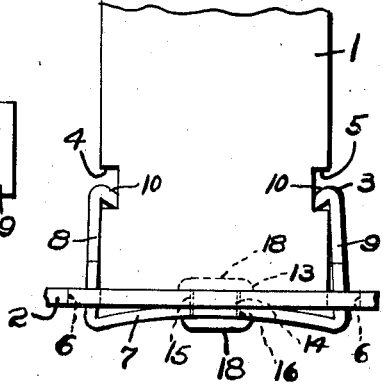
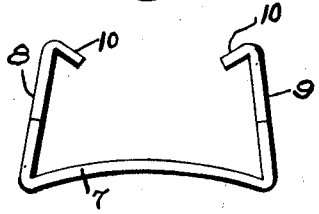
Inventor:
Wilford C. MacFadden
By Walter S. Jones Att'y.

Patented Dec. 17, 1940

2,225,592

UNITED STATES PATENT OFFICE 2,225,592

FASTENER ATTACHED STRUCTURE AND FASTENER FOR THE SAME

Wilford C. MacFadden, Philadelphia, Pa., assignor to United-Carr Fastener Corporation, Cambridge, Mass., a corporation of Massachusetts Application March 2, 1938, Serial No. 193,473

6 Claims. (Cl. 248—361)

My invention relates to improvements in cliplike fastener devices for securing an electrical or the like unit to a supporting structure and to installations of the same.

An object of my invention is to provide a cliplike fastener directed to an improvement over those illustrated and described in connection with my pending application Serial No. 174,641, filed November 15, 1937.

Referring to the drawing, in which I have illustrated preferred embodiments of my invention:

Figure 1 is a top plan view showing one method by which an electrical unit, such as a coil form, may be secured to a support through means of my improved fastener member;

Fig. 2 is a front view of the installation shown in Fig. 1 but showing only a portion of the coil form;

Fig. 3 is a section taken along the line 3—3 of Fig. 1;

Fig. 4 is a top view of the support to which the article is assembled by means of my fastener member;

Fig. 5 is a front view showing one of my improved fastener members in assembly with the support in position for fastener engagement with the coil form;

Fig. 6 is a front view showing the manner in which the coil form is engaged with the fastener member;

Fig. 7 is a top view of the installation shown in Fig. 6;

Fig. 8 is a top view of my improved clip member per se;

Fig. 9 is a front view of the clip member shown in Fig. 8; and

Fig. 10 is a front view showing a modified form of installation.

An object of my invention is to provide an improved clip member for securing an article of manufacture, such as a coil form or the like, to a supporting panel of a radio set. It is understood, however, that I do not wish to limit the use of my fastener member to installations of the type illustrated and described because it may be used advantageously for securing other articles to a supporting structure without departing from the scope and spirit of my present invention.

Referring to my first form of installation illustrated in Figs. 1–3, I have shown an electrical article of manufacture, such as a coil form 1, secured to a supporting structure 2 by means of my improved fastener member 3 through relative rotative movement of the coil form relative to the fastener member in a manner to be hereinafter described so that the article in final attachment is fixed in upstanding relation to the panel. The coil form is of cardboard or other suitable material and is preferably tubular in shape. A pair of apertures 4 and 5 are formed in opposed sides of the coil form and located in spaced predetermined relation to an end thereof. The supporting panel 2, in my preferred form, has a pair of spaced apertures 6—6 which are dimensioned so as to receive attaching portions of the fastener member 3 which extend therethrough and engage the coil form 1 through the apertures 4 and 5 so as to secure the coil form to the support.

Referring in detail to my preferred form of fastener member 3, I have shown a spring tempered fastener member having a base 7, which preferably is bulged inwardly, in normal position of the fastener, as most clearly shown in Fig. 9. The base 7, as a result of the bulge therein, is enabled to act as an expansible and contractible portion for effecting secure engagement of the fastener member with an article to be secured to the supporting panel when the parts of the installation have been finally assembled together. At the free ends of the base 7 I have provided a pair of yieldable arms 8 and 9 which extend in angular relation to the base in spaced relation one to another and are normally in slightly inclined relation one to another. At the free ends of the arms 8 and 9 I have provided inwardly-extending hook-like portions 10—10 which are adapted to engage the covering 1 through the apertures 4 and 5 thereof for securing the coil form to the support. Opposite edges of each of the hook-like portions 10—10 are curved symmetrically toward the outermost free end of the portion thereby providing camming means 11—11 on opposite sides of the respective hook-like portions (Figs. 7 and 8) adapted to effect fastener engagement of the coil form with the fastener through rotative movement of the coil form relative to the fastener, as will be described.

Assembly of the component parts of my first form of installation is a relatively simple matter and is carried out through moving the arms 8 and 9 of the fastener member through the apertures 6—6 of the support 2 so that the base 7 of the fastener member is disposed on one side of the support, which may be called the lower side, with the hook-like portions 10—10 disposed on an opposite side of the support from the base. Next, pressure is exerted on the base 7 by a thumb or finger of the operator or a suitable tool (not shown) so as to substantially flatten the base whereby the hook-like portions of the fastener member are disposed in spaced relation to the support 2 (Fig. 2) at a distance therefrom to enable them to be received by the apertures 4 and 5 of the coil form. While the base 7 is in the aforesaid flattened position, the coil form 1 is moved toward the fastener member so as to engage the hook-like portions 10 of the arm 8 with the coil form through the aperture 4 thereof. As a result of this step, the parts are positioned relative to each other with the hook-like attaching portion 10 of the arm 8 initially engaged with the material of the coil adjacent the aperture 4 and a camming portion 11 of the hook-like portion 10 of the arm 9 in engagement with an outer surface of the coil form at a point on the surface thereof spaced from the aperture 5, as most clearly shown in Figs. 6 and 7. Next, having reference to the relative position of the parts as shown in Fig. 7, the coil form is rotated in a clockwise direction whereupon the arm 9 is moved outwardly away from the arm 8 as a result of engagement of the camming means 11 of its hook-like portion 10 with the surface of the coil form until the aperture 5 is turned into engaging position opposite the hook-like portion 10, at which time the arm 9 springs toward the arm 8 to engage the hook-like portion 10 of the arm 9 with the coil form through the aperture 5. At the same time the hook-like portion 10 of the arm 8 will be finally engaged with the coil form through the aperture 4. When pressure for flattening the base 7 is relaxed, opposite ends of the base move toward normal position tending to pull the hook-like portions 10—10 in a downward direction so as to engage them with material 12 of the coil form adjacent the lower side of the apertures 4 and 5, as most clearly shown in Fig. 3. Thus the coil form is secured in firm attachment to the support.

My second form of installation differs from the installation shown in Figs. 1–3 in that the fastener member 3 is permanently secured to the support 2 by an attaching means, such as a rivet 13, having a shank 14 extending through an opening 15 in the support 2 and an opening 16 in the base 7 of the fastener member, and head portions 18—18 at opposite ends of the shank 14 engaging respective outer surfaces of the support and the base. In securing the coil form 1 to the fastener member of my second installation, the base 7 is flattened to permit relative rotative engagement of the coil form therewith in the manner in which the coil form is secured to the fastener member of my first installation. Thus the rivet 13 acts to hold the parts in assembly during the flattening of the base of the fastener.

Although I have illustrated and described preferred embodiments of my invention, I do not wish to be limited thereby because the scope of my invention is best defined in the following claims.

I claim:

1. The method of attaching an article of manufacture having apertures in opposed sides to a support having openings therein by a fastener member having a base and a pair of attaching portions extending from said base, said attaching portions having inwardly-bent portions, which comprises passing the attaching portions of the fastener through the support, entering one of said inwardly-bent portions into an aperture in said article of manufacture and then rotating said article whereby the other aperture is brought into alignment with the other inwardly-bent portion, and said article is thereby secured to said support.

2. A method of attaching an article of manufacture having apertures in opposed sides to a support having openings therein by a fastener member comprising a base having an outwardly-bulged formation, and a pair of attaching portions extending from said base, said attaching portions having inwardly-extending hook-like portions, which comprises passing the attaching portions of the fastener through the support whereby said base is disposed on one side of said support and said hook-like portions on an opposite side thereof, applying pressure to said base to flatten the same to a predetermined degree, entering one of said hook-like portions into an aperture of said article of manufacture, rotating said article whereby the other aperture is brought into alignment with the other hook-like portion and then releasing pressure on said base so that said hook-like portions move into engagement with material of said article adjacent said apertures whereby said article is secured to said support.

3. In combination, an article of manufacture having apertures in opposed sides, a support having openings therein and a fastener member for securing said article to said support, said fastener member having a base disposed on one side of said support, a pair of arms extending from said base through said support and having inwardly-bent portions on the other side of said support from said base, and one of said inwardly-bent portions being engaged with said article through an aperture thereof upon relative rotation of said article whereby said article is secured to said support, and one of said inwardly-bent portions having camming means whereby it is movable relative to the other of said inwardly-bent portions during said relative rotation of said article.

4. In combination, a tubular-shaped article of manufacture having apertures in opposed sides, an apertured support and a fastener member for securing said article to said support, said fastener member having a yieldable base disposed on one side of said support, a pair of spaced arms extending from said base through said support, said arms having hook-like portions at their free ends, one of said hook-like portions being initially engaged with said article through an aperture thereof, the other of said hook-like portions being engaged with said article through another aperture upon relative rotation of said article whereby said article is secured to said support, and each of said hook-like portions having a curved edge whereby one of said hook-like portions is cammed away from the other of said hook-like portions upon engagement with the curved outer surface of said article during said relative rotation thereby to engage said last-mentioned hook-like portion with said article through one of said apertures.

5. In combination, an article of manufacture having apertures in opposed sides, a support having openings therein and a fastener member for securing said article to said support, said fastener member having a base disposed on one side of said support, attaching means securing said base to said support, a pair of arms extending from said base through said support and having inwardly-bent portions on the other side of said support from said base, and one of said inwardly-bent portions being engaged with said article through an aperture thereof upon relative rotation of said article whereby said article is secured to said support.

6. In combination, an article of manufacture having an aperture in a side thereof, a support and a fastener member for securing said article to said support, said fastener having a base secured to said support, a pair of arms extending from said base and having inwardly-extending portions for engaging said article to secure the same to said support, one of said inwardly-extending portions being engaged with said article through an aperture thereof upon relative rotation of said article, and one of said inwardly-extending portions having camming means whereby it is movable relative to the other of said inwardly-extending portions during said relative rotation of said article.

WILFORD C. MacFADDEN.